(12) United States Patent
Telfer et al.

(10) Patent No.: US 10,796,649 B2
(45) Date of Patent: Oct. 6, 2020

(54) NANO-PARTICLE BASED VARIABLE TRANSMISSION DEVICES

(71) Applicant: E INK CORPORATION, Billerica, MA (US)

(72) Inventors: Stephen J. Telfer, Arlington, MA (US); Richard J. Paolini, Jr., Framingham, MA (US); Stephen Bull, Windham, NH (US); Joshua A. Ritchey, Melrose, MA (US); Kosta Ladavac, Somerville, MA (US); Lee Yezek, Watertown, MA (US); Craig A. Herb, Medford, MA (US); Peter Carsten Bailey Widger, Nashua, NH (US)

(73) Assignee: E Ink Corporation, Billerica, MA (US)

( * ) Notice: Subject to any disclaimer, the term of this patent is extended or adjusted under 35 U.S.C. 154(b) by 242 days.

(21) Appl. No.: 15/959,614

(22) Filed: Apr. 23, 2018

(65) Prior Publication Data

US 2018/0247599 A1    Aug. 30, 2018

Related U.S. Application Data

(63) Continuation of application No. 14/668,004, filed on Mar. 25, 2015, now Pat. No. 9,953,588.

(60) Provisional application No. 61/970,096, filed on Mar. 25, 2014.

(51) Int. Cl.
    *G09G 3/34*     (2006.01)
    *G02F 1/167*    (2019.01)
    *G02F 1/1685*   (2019.01)
    *H01B 3/10*     (2006.01)

(52) U.S. Cl.
    CPC .............. *G09G 3/344* (2013.01); *G02F 1/167* (2013.01); *G02F 1/1685* (2019.01); *H01B 3/10* (2013.01); *G02F 2202/36* (2013.01); *G02F 2203/30* (2013.01); *Y10T 428/249997* (2015.04)

(58) Field of Classification Search
    CPC ................... G09G 3/344; G02F 1/167; Y10T 428/249997
    See application file for complete search history.

(56) References Cited

U.S. PATENT DOCUMENTS

| | | |
|---|---|---|
| 4,418,346 A | 11/1983 | Batchelder |
| 4,741,780 A | 5/1988 | Atkinson |
| 5,872,552 A | 2/1999 | Gordon, II |
| 5,961,804 A | 10/1999 | Jacobson |
| 6,017,584 A | 1/2000 | Albert |
| 6,120,588 A | 9/2000 | Jacobson |
| 6,120,839 A | 9/2000 | Comiskey |

(Continued)

OTHER PUBLICATIONS

European Patent Office, PCT/US2018/028824, International Search Report and Written Opinion, dated Dec. 21, 2018.

(Continued)

*Primary Examiner* — Gerard Higgins
(74) *Attorney, Agent, or Firm* — Ioannis Constantinides (57) ABSTRACT

A variable transmission medium comprises a fluid and a plurality of nanoparticles dispersed in the fluid, wherein addition of acid to the fluid causes the nanoparticles to flocculate and form aggregates of particles that scatter light. The nanoparticles may comprise at least one metal oxide, such as titanium dioxide, zinc oxide or zirconium dioxide. The fluid may have a dielectric constant less than about 10. The medium may be used in, for example, privacy glass for a conference room.

11 Claims, 6 Drawing Sheets

(56) References Cited

U.S. PATENT DOCUMENTS

| | | |
|---|---|---|
| 6,130,774 A | 10/2000 | Albert |
| 6,144,361 A | 11/2000 | Gordon, II |
| 6,172,798 B1 | 1/2001 | Albert |
| 6,184,856 B1 | 2/2001 | Gordon, II |
| 6,225,971 B1 | 5/2001 | Gordon, II |
| 6,241,921 B1 | 6/2001 | Jacobson |
| 6,262,706 B1 | 7/2001 | Albert |
| 6,262,833 B1 | 7/2001 | Loxley |
| 6,271,823 B1 | 8/2001 | Gordon, II |
| 6,300,932 B1 | 10/2001 | Albert |
| 6,323,989 B1 | 11/2001 | Jacobson |
| 6,377,387 B1 | 4/2002 | Duthaler |
| 6,515,649 B1 | 2/2003 | Albert |
| 6,538,801 B2 | 3/2003 | Jacobson |
| 6,580,545 B2 | 6/2003 | Morrison |
| 6,652,075 B2 | 11/2003 | Jacobson |
| 6,672,921 B1 | 1/2004 | Liang |
| 6,693,620 B1 | 2/2004 | Herb |
| 6,721,083 B2 | 4/2004 | Jacobson |
| 6,727,881 B1 | 4/2004 | Albert |
| 6,788,449 B2 | 9/2004 | Liang |
| 6,822,782 B2 | 11/2004 | Honeyman |
| 6,866,760 B2 | 3/2005 | Paolini, Jr. |
| 6,870,661 B2 | 3/2005 | Pullen et al. |
| 6,922,276 B2 | 7/2005 | Zhang |
| 6,950,220 B2 | 9/2005 | Abramson et al. |
| 6,982,178 B2 | 1/2006 | LeCain et al. |
| 7,002,728 B2 | 2/2006 | Pullen |
| 7,012,600 B2 | 3/2006 | Zehner |
| 7,038,655 B2 | 5/2006 | Herb |
| 7,075,502 B1 | 7/2006 | Drzaic |
| 7,116,318 B2 | 10/2006 | Amundson |
| 7,170,670 B2 | 1/2007 | Webber |
| 7,180,649 B2 | 2/2007 | Morrison et al. |
| 7,230,750 B2 | 6/2007 | Whitesides |
| 7,230,751 B2 | 6/2007 | Whitesides et al. |
| 7,236,290 B1 | 6/2007 | Zhang |
| 7,236,291 B2 | 6/2007 | Kaga et al. |
| 7,247,379 B2 | 7/2007 | Pullen et al. |
| 7,312,784 B2 | 12/2007 | Baucom |
| 7,312,916 B2 | 12/2007 | Pullen |
| 7,321,459 B2 | 1/2008 | Masuda |
| 7,327,511 B2 | 2/2008 | Whitesides |
| 7,339,715 B2 | 3/2008 | Webber |
| 7,352,502 B2 | 4/2008 | Miyazaki |
| 7,375,875 B2 | 5/2008 | Whitesides |
| 7,411,719 B2 | 8/2008 | Paolini, Jr. |
| 7,411,720 B2 | 8/2008 | Honeyman et al. |
| 7,420,549 B2 | 9/2008 | Jacobson |
| 7,453,445 B2 | 11/2008 | Amundson |
| 7,532,388 B2 | 5/2009 | Whitesides et al. |
| 7,535,624 B2 | 5/2009 | Amundson et al. |
| 7,679,814 B2 | 3/2010 | Paolini, Jr. |
| 7,746,544 B2 | 6/2010 | Comiskey |
| 7,839,564 B2 | 11/2010 | Whitesides et al. |
| 7,848,006 B2 | 12/2010 | Wilcox |
| 7,903,319 B2 | 3/2011 | Honeyman |
| 7,999,787 B2 | 8/2011 | Amundson |
| 8,009,348 B2 | 8/2011 | Zehner |
| 8,018,640 B2 | 9/2011 | Whitesides |
| 8,115,729 B2 | 2/2012 | Danner |
| 8,199,395 B2 | 6/2012 | Whitesides |
| 8,270,064 B2 | 9/2012 | Feick |
| 8,305,341 B2 | 11/2012 | Arango |
| 8,319,759 B2 | 11/2012 | Jacobson |
| 8,390,918 B2 | 3/2013 | Wilcox |
| 8,582,196 B2 | 11/2013 | Walls |
| 8,593,718 B2 | 11/2013 | Comiskey |
| 8,815,786 B2 | 8/2014 | Meine et al. |
| 9,726,957 B2 | 8/2017 | Telfer |
| 2005/0012980 A1 | 1/2005 | Wilcox |
| 2009/0009852 A1 | 1/2009 | Honeyman |
| 2009/0034055 A1 | 2/2009 | Gibson |
| 2009/0206499 A1 | 8/2009 | Whitesides |
| 2009/0225398 A1 | 9/2009 | Duthaler |
| 2010/0148385 A1 | 6/2010 | Balko |
| 2012/0293858 A1 | 11/2012 | Telfer |

OTHER PUBLICATIONS

Kitamura, T. et al., "Electrical toner movement for electronic paper-like display", Asia Display/IDW '01, pp. 1517-1520, Paper HCS1-1 (2001). Jan. 1, 2001.

Yamaguchi, Y. et al., "Toner display using insulative particles charged triboelectrically", Asia Display/IDW '01, pp. 1729-1730, Paper AMD4-4 (2001). Jan. 1, 2001.

Han, Y., et al., "Colloidal convection in thin horizontal cell III: Interfacial and transient patterns on electrodes", J. Chem. Phys. Jul. 7, 2012; 137(1) Jul. 7, 2012.

Maryott et al., "Table of Dielectric Contants of Pure Liquids", National Bureau of Standard Circular 514, p. 6 (1951). Jan. 1, 1951.

"Chemical properties of CAS Registry No. 8052-41-3" acquired from https://tools.niehs.nih.gov/cebs3/ntpviews/index.cfm?action=testarticle.propoerties@cas_number=8052%AD41%AD31/3 (Jun. 22, 2017). Jun. 22, 2017.

NANO-PARTICLE BASED VARIABLE TRANSMISSION DEVICES

REFERENCE TO RELATED APPLICATIONS

This application is a continuation of U.S. patent application Ser. No. 14/668,004, filed Mar. 25, 2015, which claims the benefit of U.S. provisional Application Ser. No. 61/970,096, filed Mar. 25, 2014. The entire contents of the aforementioned applications and of all other U.S. patents and published and copending applications mentioned below, are herein incorporated by reference in their entireties.

BACKGROUND OF INVENTION

This invention relates to variable transmission devices, such as variable transmission windows and similar devices, based upon nanoparticles, that is, particles having dimensions substantially less than the wavelengths of visible light.

The term "gray state" is used herein in its conventional meaning in the imaging art to refer to a state intermediate two extreme optical states of a pixel, and does not necessarily imply a black-white transition between these two extreme states. For example, it is known to use electro-optic displays as variable transmission windows in which the extreme states are substantially transparent and essentially opaque, so that an intermediate "gray state" would be partially transmissive but may not actually be gray in color. Indeed, if the particles used are light-scattering, a partially transmissive "gray state" may actually be colored white. The term "monochrome" may be used hereinafter to denote a drive scheme which only drives pixels to their two extreme optical states with no intervening gray states.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

One type of electro-optic display, which has been the subject of intense research and development for a number of years, is the particle-based electrophoretic display, in which a plurality of charged particles move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan, 2001, Paper AMD4-4). See also U.S. Pat. Nos. 7,321,459 and 7,236,291. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

This application is related to U.S. Pat. Nos. 6,323,989; 6,538,801 and 6,721,083.

Numerous patents and applications assigned to or in the names of the Massachusetts Institute of Technology (MIT) and E Ink Corporation describe various technologies used in encapsulated electrophoretic and other electro-optic media. Such encapsulated media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. The technologies described in these patents and applications include:

(a) Electrophoretic particles, fluids and fluid additives; see for example U.S. Pat. Nos. 5,961,804; 6,017,584; 6,120,588; 6,120,839; 6,262,706; 6,262,833; 6,300,932; 6,323,989; 6,377,387; 6,515,649; 6,538,801; 6,580,545; 6,652,075; 6,693,620; 6,721,083; 6,727,881; 6,822,782; 6,870,661; 7,002,728; 7,038,655; 7,170,670; 7,180,649; 7,230,750; 7,230,751; 7,236,290; 7,247,379; 7,312,916; 7,375,875; 7,411,720; 7,532,388; 7,679,814; 7,746,544; 7,848,006; 7,903,319; 8,018,640; 8,115,729; 8,199,395; 8,270,064; and 8,305,341; and U.S. Patent Applications Publication Nos. 2005/0012980; 2008/0266245; 2009/0009852; 2009/0206499; 2009/0225398; 2010/0148385; 2010/0207073; and 2011/0012825;

(b) Capsules, binders and encapsulation processes; see for example U.S. Pat. Nos. 6,922,276 and 7,411,719;

(c) Films and sub-assemblies containing electro-optic materials; see for example U.S. Pat. Nos. 6,982,178 and 7,839,564;

(d) Backplanes, adhesive layers and other auxiliary layers and methods used in displays; see for example U.S. Pat. Nos. 7,116,318 and 7,535,624;

(e) Color formation and color adjustment; see for example U.S. Pat. Nos. 7,075,502 and 7,839,564;

(f) Methods for driving displays; see for example U.S. Pat. Nos. 7,012,600 and 7,453,445;

(g) Applications of displays; see for example U.S. Pat. Nos. 7,312,784 and 8,009,348; and (h) Non-electrophoretic displays, as described in U.S. Pat. Nos. 6,241,921; 6,950,220; 7,420,549 and 8,319,759; and U.S. Patent Application Publication No. 2012/0293858.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

A related type of electrophoretic display is a so-called "microcell electrophoretic display". In a microcell electrophoretic display, the charged particles and the fluid are not encapsulated within microcapsules but instead are retained within a plurality of cavities formed within a carrier medium, typically a polymeric film. See, for example, U.S. Pat. Nos. 6,672,921 and 6,788,449, both assigned to Sipix Imaging, Inc.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, U.S. Pat. Nos. 5,872,552; 6,130,774; 6,144,361; 6,172,798; 6,271,823; 6,225,971; and 6,184,856. Dielectrophoretic displays, which are similar to electrophoretic displays but rely upon variations in electric field strength, can operate in a similar mode; see U.S. Pat. No. 4,418,346.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating, gravure coating, dip coating; spray coating, meniscus coating; spin coating, brush coating; air knife coating; silk screen printing processes; electrostatic printing processes; thermal printing processes; ink jet printing processes; electrophoretic deposition (See U.S. Pat. No. 7,339,715); and other similar techniques.) Thus, the resulting display can be flexible. Further, because the display medium can be printed (using a variety of methods), the display itself can be made inexpensively.

As already mentioned, the present invention relates to variable transmission devices, such as variable transmission windows and similar devices; such variable transmission devices may alternatively be denoted "light modulators". U.S. Pat. No. 7,327,511 describes various factors which are important in adapting electrophoretic media for optimum performance in light modulators. One important factor is minimization of haze. In this application, "haze" refers to the percentage of diffuse transmitted light (light that is scattered as it is transmitted), compared to total transmitted light. When designing light modulators that can be electrically switched from an open, clear state to a closed opaque state, it is desirable that the open state have a haze of less than 2 percent, while the closed state should have haze greater than 90 percent. Ideally, the closed state should be white, i.e., non-absorbing. Prior art attempts to develop light modulators using electrophoretic media (see, for example, U.S. Pat. Nos. 7,327,511 and 7,999,787) have relied upon lateral movement of "micro-scale" scattering particles (having dimensions in the range of about 200 to about 1000 nm) from a closed state, in which the particles are approximately uniformly distributed over the plane of the display, to an open state, in which the particles are concentrated and occupy only a minor proportion of the plane of the display; typically, in an encapsulated display, the particles are concentrated at the walls of microcapsules, PDEPID droplets, or microcells. The problem with concentrating scattering particles is that the contrast ratio between the closed and open states is typically of the order of 10:1 since in the open state the scattering particles are still present and modulate light, albeit over a much smaller area than in the closed state. To improve contrast ratio, it is desirable to provide a method for essentially complete elimination of scattering in the open state.

The aforementioned U.S. Pat. Nos. 6,323,989; 6,538,801 and 6,721,083 describe electrophoretic displays using electrically-charged nanoparticles, which move between an open ("dispersed") state, in which the particles are uniformly dispersed throughout a fluid, and a closed ("aggregated") state in which the nanoparticles move electrophoretically and are gathered into aggregates substantially larger than the individual nanoparticles. Since the particles have dimensions much smaller than the wavelength of visible light, in the dispersed state the particles are essentially colorless and haze-free, while in the aggregated state the particles are larger and display increased color and haze. However, it has been found empirically that there are problems in relying upon electrophoretic movement of nanoparticles since such nanoparticles are often only very weakly charged. For example, it has been found empirically that dispersions of alumina-passivated titania in Isopar G/oleic acid have a very weakly positive zeta potential (~5 mV), which is consistent with only a very small proportion of the particles bearing a charge. The conductivity of these dispersions varies linearly with concentration with a slope that can be explained if only about 1 percent of the particles are charged.

Accordingly, if a variable transmission device is to be constructed based upon nanoparticles, there is a need for a more effective method of aggregating and de-aggregating the nanoparticles than the electrophoretic methods described in the aforementioned U.S. Pat. Nos. 6,323,989; 6,538,801 and 6,721,083, and the present invention seeks to provide such a method.

SUMMARY OF INVENTION

Accordingly, in one aspect this invention provides a variable transmission medium comprising a fluid and a plurality of nanoparticles dispersed in the fluid, wherein addition of acid to the fluid causes the nanoparticles to flocculate and form aggregates of particles that scatter light. The acid may be introduced electrochemically, for example by electrolysis of water to provide a proton gradient or through an electroactive layer applied to an electrode. Alternatively, the acid may be produced oxidation or reduction of a redox couple, which may comprise organic compounds that are reversibly oxidized and reduced, for example mixtures of quinones and hydroquinones as described in U.S. Patent Application Publication No. 2015/0015932.

In another aspect, this invention provides nanoparticles having adsorbed thereon a stabilizing material that comprises a carboxylic acid or carboxylate group attached to a chain of at least 10 carbon atoms.

In a further aspect, this invention provides a variable transmission medium comprising a fluid and a plurality of nanoparticles dispersed in the fluid, the nanoparticles have adsorbed thereon a stabilizing material, the stabilizing material being capable of desorbing from the nanoparticles upon a change in conditions in the fluid, thereby causing the nanoparticles to flocculate and form aggregates of particles that scatter light.

This invention extends to a variable transmission medium of the present invention provided with an acid generating means, which may comprise one or more electrodes. This invention also extends to a variable transmission assembly comprising two light-transmissive (and desirably essentially transparent) substrates, a variable transmission medium of the present invention disposed between the substrates, and means (which may be acid generating means) for varying the transmissivity of the variable transmission medium. Such assemblies are useful as variable transmission windows and similar devices.

BRIEF DESCRIPTION OF DRAWINGS

FIGS. 6A and 6B are graphs illustrating the variation of haze with time in certain experiments described in Example 4 below, with FIG. 6A showing the drive from a clear to an opaque state, while FIG. 6B shows the recovery to the clear state without driving.

DETAILED DESCRIPTION

As indicated above, the present invention provides a variable transmission medium comprising a fluid and a plurality of nanoparticles dispersed in the fluid. A stabilizing material is adsorbed on the nanoparticles, and this stabilizing material keeps the nanoparticles separated from one another so that the variable transmission medium is substantially non-reflective. However, upon a change in conditions in the fluid, the nanoparticles may be induced to flocculate and thereby form aggregates of particles that scatter light, causing the medium to become reflective and thus less transmissive of light. This change in conditions in the fluid may involve local introduction of acid, which may lead to desorption of the stabilizing material from the nanoparticles. Such a local introduction of acid may be achieved by passing a current through the device (i.e., by providing an electrochemically-induced chemical change in the fluid).

The material used to form the nanoparticles used in the present invention may be any material which is substantially non-reflective when the nanoparticles are uniformly dispersed throughout the medium, but which causes the medium to become reflective when the nanoparticles flocculate. In general, metal oxide nanoparticles are preferred because of their high refractive index and consequent high light scattering performance. Furthermore, finely-dispersed nanoparticulate metal oxides having particle diameters in the range of 10-100 nm are readily available commercially, having been used to provide ultraviolet-absorbing, transparent coatings for applications such as thermal printing and cosmetics (sunscreens). Examples of such metal oxides include titanium dioxide, zinc oxide, zirconium dioxide and the like. When the nanoparticles are closely aggregated into clusters of diameter 100-500 nm (or larger) in a medium of relatively low refractive index, they exhibit efficient scattering of light.

Preferred materials used to form the nanoparticles in the variable transmission media of the present invention include titanium dioxide and zirconium dioxide. Titanium dioxide (titania) has an especially high refractive index (about 4.23 for the rutile form) and therefore exhibits very efficient scattering of light when aggregated into clusters in a medium of lower refractive index. This material, however, has a band gap of 3.2-3.4 eV and thus can absorb light of visible wavelengths; such absorption cannot be prevented by optical filtration without leading to introduction of an undesirable tint into a variable transmission assembly of the invention. Once light has been absorbed (leading to formation of an electronically excited state of the titanium dioxide), undesirable chemical reactions, such as oxidation of water, may occur, causing degradation of the nanoparticles or of other elements comprising the assemblies of the invention. It is known in the art that such photoreactions may be alleviated by "passivating" the surface of titanium dioxide particles, by for example coating them with a layer of another metal oxide. However, such passivation may not be perfectly effective in eliminating undesirable photochemical side reactions. For example, the nanoparticles used in the present invention may be on the order of 10-25 nm in diameter. Applying a continuous passivating coating about 5 nm in thickness on to such a nanoparticle is synthetically difficult and can dramatically lower the average refractive index of the resulting particles. Further, such a coating may be fractured during a subsequent milling step, exposing a surface of reactive titanium dioxide.

For this reason, a particularly preferred material for use in forming the nanoparticles of the present invention is zirconium dioxide (zirconia). Although the refractive index of zirconium dioxide (about 2.13) is lower than that of titanium dioxide, the band gap of zirconium dioxide is substantially larger (5-7 eV, depending upon the precise size and constitution of the nanoparticles). Zirconium dioxide therefore does not absorb any significant light in the visible spectrum and is much less prone to suffer from undesirable photochemical reactions than is titanium dioxide.

Alternative materials for use in the present invention include alumina (whose refractive index is, however, only about 1.7), zinc oxide (which has a band gap of only about 3.3 eV) and silicon carbide (which, however, is colored).

In the variable transmission media of the present invention, converting a fine dispersion of nanoparticles into a clustered (flocculated) configuration provides a switch of the media from a transparent to a scattering (opaque) state. The reverse transition from an opaque to a transparent state may be effected by thermal re-equilibration, and this transition can be accelerated by high-frequency AC addressing.

The fluids used in the variable transmission media of the present invention will typically be of low dielectric constant (preferably less than 10 and desirably less than 3). Especially preferred solvents include aliphatic hydrocarbons such as heptane, octane, and petroleum distillates such as Isopar (Registered Trade Mark) or Isane; terpenes such as limonene; and aromatic hydrocarbons such as toluene. A particularly preferred solvent is limonene, since it combines a low dielectric constant (2.3) with a relatively high refractive index (1.47). In encapsulated media of the present invention, it is preferred that the refractive index of the dispersion of nanoparticles match as closely as possible that of the encapsulating material, and this is easier to achieve (when employing commonly-available polymeric encapsulants) when the refractive index of the solvent is close to that of the encapsulant. If the refractive index of the solvent is too low, an unacceptably high concentration of nanoparticles (whose refractive index is always higher than that of the solvent) may be required to match the refractive index of the encapsulant.

As mentioned above, a stabilizing material is adsorbed on the nanoparticles when they are dispersed in the solvent, and this stabilizing material keeps the nanoparticles separated from one another so that the variable transmission medium is substantially non-reflective when the nanoparticles are in their dispersed state. As is known in the art, dispersing a nanoparticle (typically a metal oxide nanoparticle, as described above) in a solvent of low dielectric constant may be achieved by the use of a surfactant. Such a surfactant typically comprises a polar "head group" and a non-polar "tail group" that is compatible with or soluble in the solvent. In the present invention, it is preferred that the non-polar tail group be a saturated or unsaturated hydrocarbon moiety, or another group that is soluble in hydrocarbon solvents, such as for example a poly(dialkylsiloxane). The polar group may be any polar organic functionality, including ionic materials such as ammonium, sulfonate or phosphonate salts, or acidic or basic groups. Particularly preferred head groups are carboxylic acid or carboxylate groups. It is thought that such groups may facilitate the flocculation of the nanoparticles by acid-induced desorption, as described below.

Figure 1:
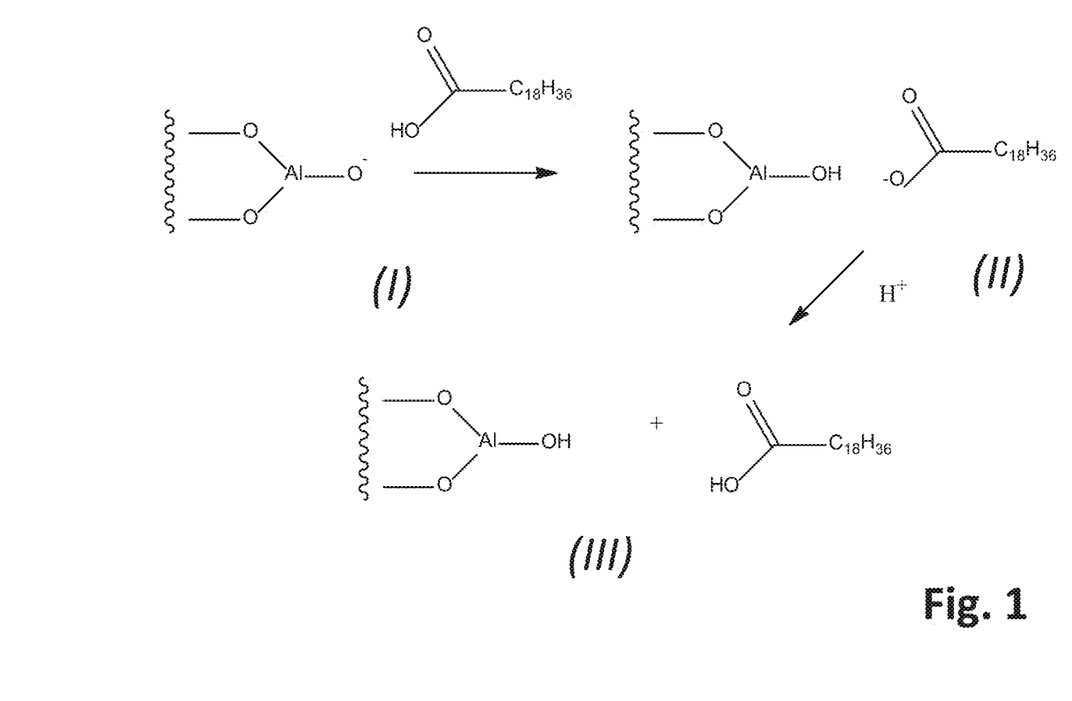
FIG. 1 of the accompanying drawings is a reaction scheme illustrating schematically the chemical changes occurring in one variable transmission medium of the present invention during adsorption of a stabilizing material on to a pigment particle, and subsequent desorption of the stabilizing material upon addition of acid to the medium.

FIG. 1 of the accompanying drawings illustrates schematically the chemical changes that may occur in one variable transmission medium of the present invention during adsorption of a stabilizing material on to a pigment particle, and subsequent desorption of the stabilizing material upon addition of acid to the medium. Formula I in FIG. 1 illustrates the deprotonated form of a hydroxyl group which is present on most metal oxide nanoparticle pigments. In FIG. 1, the metal is illustrated as aluminum, since aluminum oxide (alumina) is commonly used as a passivating coating on metal oxides of higher refractive index, such as titanium dioxide; see, for example, U.S. Pat. No. 6,822,782, especially Example 31. The metal oxide nanoparticle is treated with a long chain fatty acid (oleic acid is illustrated) to produce, as shown in Formula II in FIG. 1, a hydroxyl group and a fatty acid anion associated with the metal oxide nanoparticle. (Although FIG. 1 shows a hydroxyl group on the alumina and a fatty acid anion, in practice the anion is likely to be hydrogen bonded to the hydroxyl group.) In the hydrocarbon solvent (or other solvent of low dielectric constant) commonly used in variable transmission media, the presence of the long chain fatty acid anion associated with the metal oxide nanoparticle changes the surface characteristics of the nanoparticle and sterically stabilizes the nanoparticle; thus, a thin layer (typically 10-50 µm) of such a dispersion of nanoparticles will not appreciably scatter light. On the other hand, introduction into the dispersion of an acid stronger than oleic acid will lead to protonation of the oleic acid, and consequent release of the oleic acid from the nanoparticle surface, as illustrated in Formula III in FIG. 1. Desorption of the oleic acid removes the steric stabilization of the nanoparticles, which proceed to form aggregates which scatter light.

Preferred stabilizing materials include long-chain fatty acids such as oleic acid, or oligomers of such materials such as poly(hydroxystearic acid). Many variants of these materials will be apparent to those skilled in the art, however in general the non-polar tail group will be soluble in a solvent of low dielectric constant (for example, an aliphatic carbon chain of at least 10 atoms or a poly(dialkylsiloxane)), and the polar head group will be an acid or the salt of an acid having an aqueous pKa in the range of 2-6, such as a carboxylic acid.

Formation of the nanoparticle/acid complex is readily effected by, for example, milling a nanoparticulate metal oxide pigment in a solvent of low dielectric constant in the presence of the stabilizing group to form a dispersion of very small particles.

The strong acid required to protonate the fatty acid anion may be introduced electrochemically; it is known that electrolysis of water creates a proton gradient in an electrochemical cell. Alternatively, the redox couple required to generate acid could comprise organic compounds that are reversibly oxidized and reduced, examples including mixtures of quinones and hydroquinones as described in detail in as described in U.S. Patent Application Publication No. 2015/0015932. The use of organic electrode materials such as poly(3,4-ethylenedioxythiophene) polystyrene sulfonate (PEDOT) may also lead to electrochemical reactions useful in the present invention.

Figure 2:
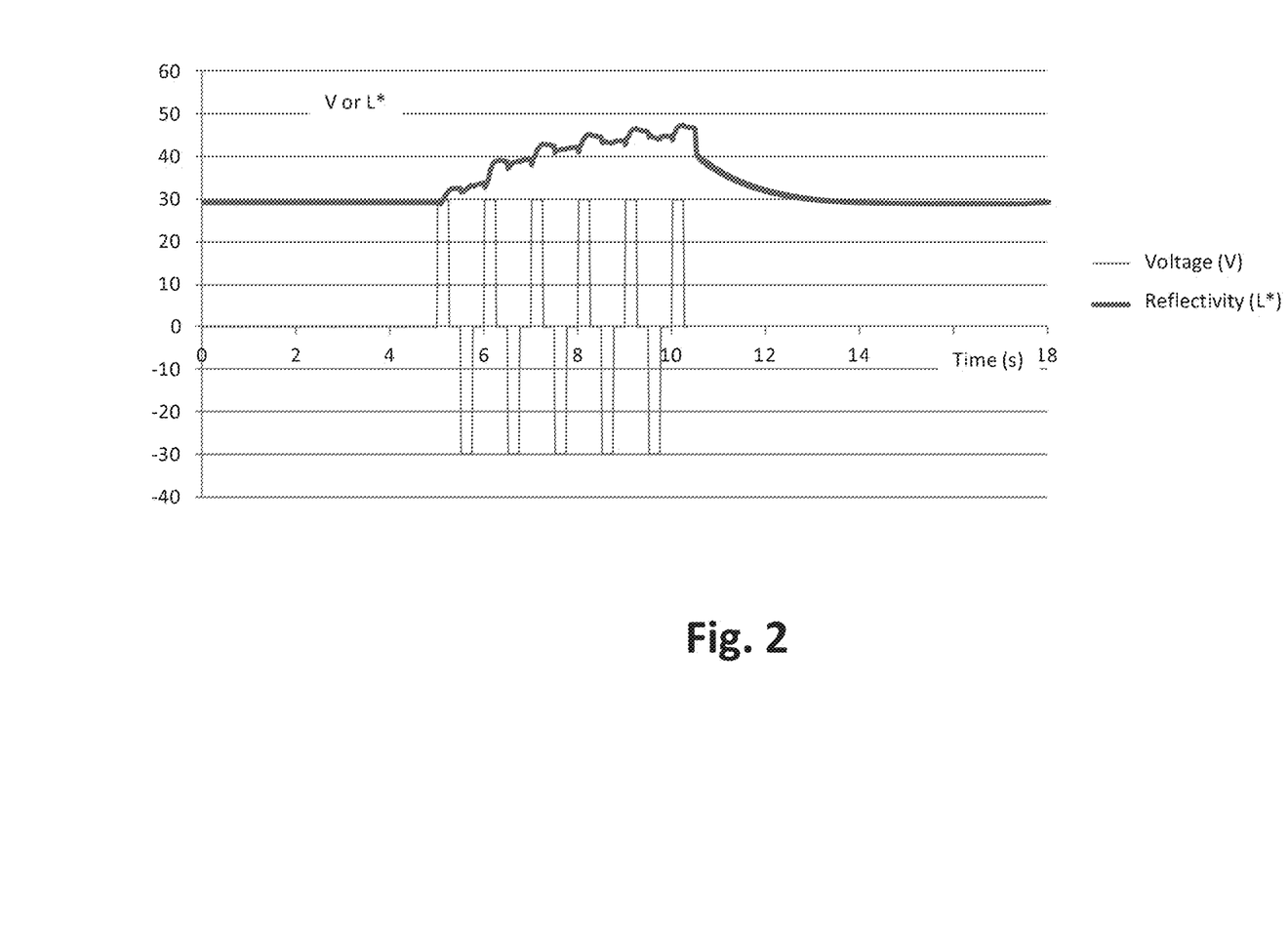
FIG. 2 is a graph showing a waveform applied to a variable transmission medium of the present invention and the resultant changes in the reflectivity of the medium, as described in Example 1 below.

During electrochemical generation of acid, the nanoparticles will be flocculate in the vicinity of the anode. The flocculated material may then move from its adjacent the anode, either being carried by electrochemical currents that may be spatially organized, as described in Y. Han and D. Grier, "Colloidal convection in thin horizontal cell III: Interfacial and transient patterns on electrodes", J. Chem. Phys. 2012 Jul. 7; 137(1):014504. doi: 10.1063/1.4730752, or by intrinsic electrophoretic motion. Reversal of the light scattering may be achieved thermally or by driving the cell with alternating current fields at a frequency sufficiently high that electrochemistry does not take place; experimentally this has been found to be at 60 Hz or higher. At such frequencies phenomena such as induced-charge electro-osmosis may occur, leading to enhanced mixing and thus re-equilibration of the nanoparticle dispersion. FIG. 2 shows the change in reflectivity that can be achieved by electrically addressing a variable transmission medium of the invention. Example 1 below describes in more detail how this result was obtained.

Figure 3:
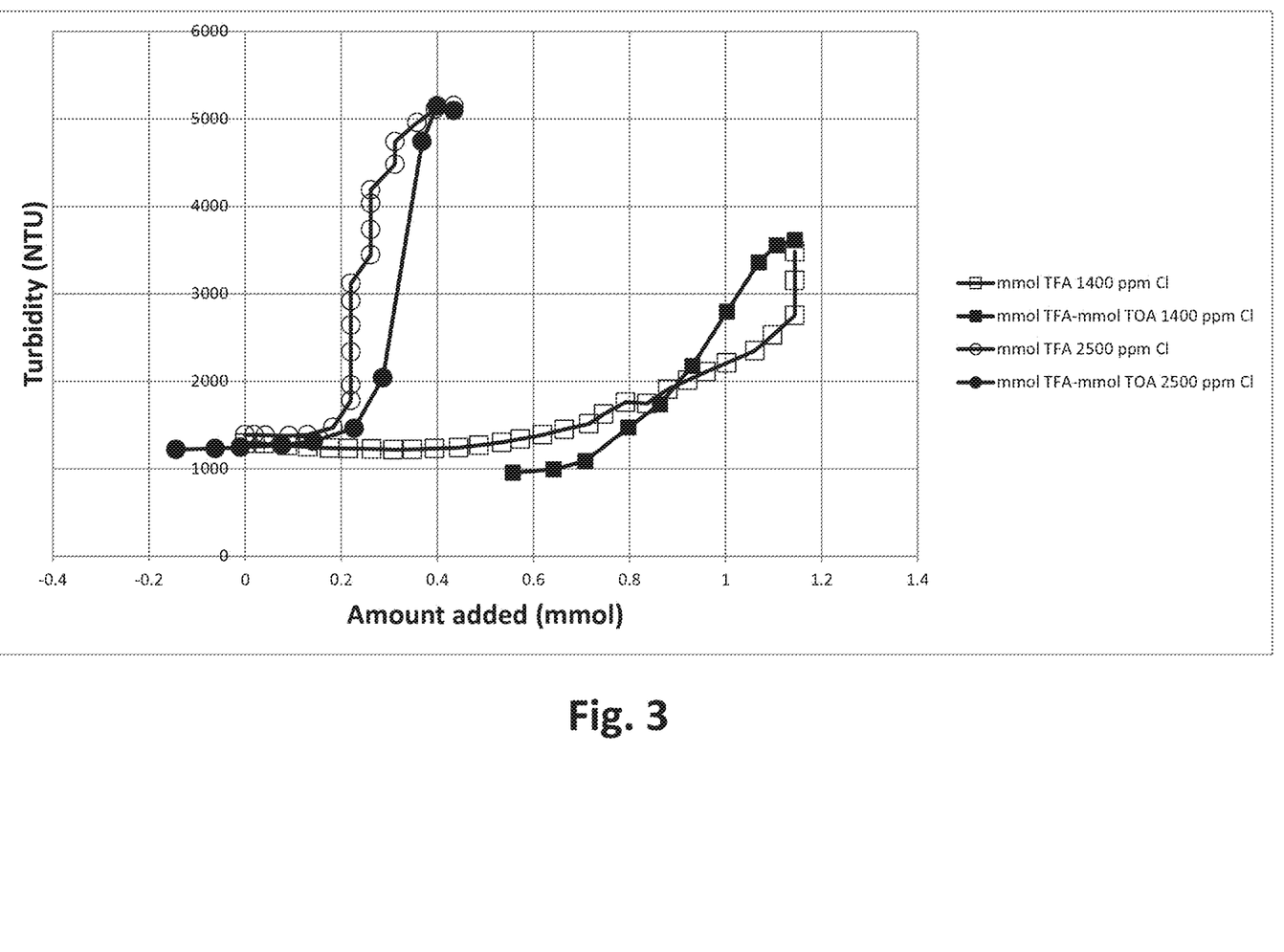
FIG. 3 is a graph that shows the effect of acid and base titrations on the optical clarity of dispersions of nanoparticles for use in the present invention.

As shown in FIG. 3 and described in detail in Example 2 below, dispersions of nanoparticles suitable for use in the present invention are substantially non-scattering in the resting state but may be induced to flocculate, thereby forming a state that scatters light, by the introduction of an acid. Such an acid may be, for example, a strong carboxylic acid such as trifluoroacetic acid. Similar, but weaker flocculation may be induced by adding a weaker carboxylic acid containing fewer than 10 carbon atoms. In many cases, it has been found that such flocculation may be reversed by the addition of a suitable base, but it is not a requirement of the present invention that such a reversal be evident.

Figure 4:
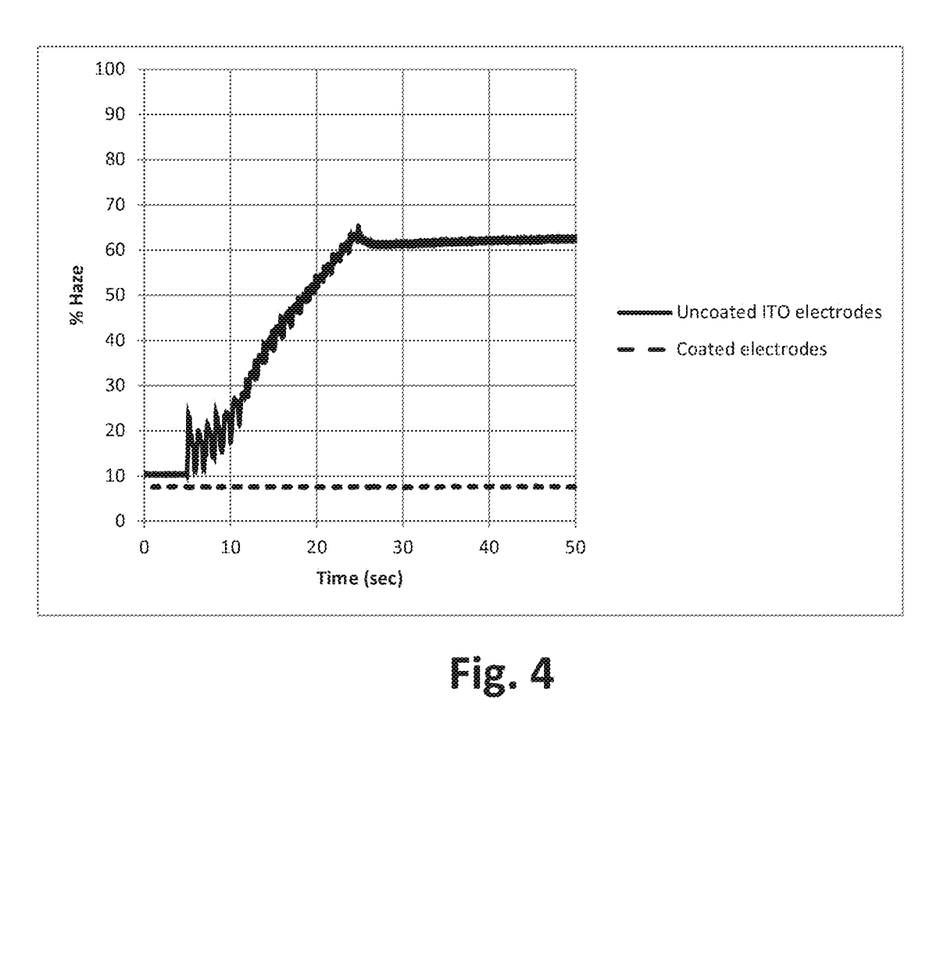
FIG. 4 is a graph showing changes in optical clarity of nanoparticle dispersions of the present invention when addressed electrically with unblocked electrodes as compared with electrodes coated with a nonconductive polymer.

As is shown in FIG. 4 and described in detail in Example 3 below, in assemblies of the present invention it is necessary that a current be passed through the variable transmission medium in order for electrically-induced flocculation of nanoparticles to occur. When a dispersion of nanoparticles of the present invention is placed between two spaced-apart electrodes, flocculation of the nanoparticles occurs when an electric current is passed but can be suppressed by coating the electrodes with a thin coating of a polymer that blocks electrochemical reactions but does not greatly reduce the electric field between the electrodes.

Figure 5:
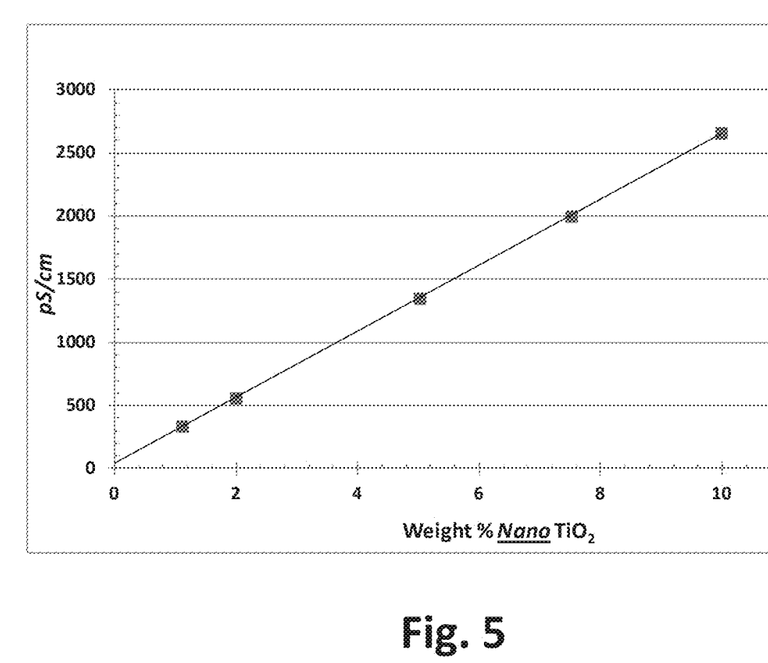
FIG. 5 is a graph showing the variation of the conductivity of an electrically charged nanoparticle dispersion with concentration of the nanoparticles.

Electrochemically-induced nanoparticle flocculation is likely to be more efficient that attempting nanoparticle flocculation by electrophoresis alone. It has been found that dispersions of alumina-passivated nanoparticulate titanium dioxide in an Isopar G/oleic acid mixture have a very weakly positive zeta potential (about 5 mV). This is consistent with only a very small proportion of the particles bearing a charge. As shown in FIG. 5, the conductivity of such dispersions varies linearly with concentration, with a slope consistent with only about 1% of the nanoparticles being charged. In contrast, the present invention is not dependent upon any charge existing on individual nanoparticles, or the mobilities of such nanoparticles, at least as regards driving the nanoparticles from their dispersed, transparent state to their flocculated, light-scattering state. This is confirmed by the observation, described above, that when one attempts to drive nanoparticles from their dispersed, transparent state to their flocculated, light-scattering state using "blocked" electrodes (i.e., electrodes provided with a coating which does not allow charge injection into the fluid), no change in the optical state of the nanoparticle dispersion occurs.

As described above, it is thought (although this is not intended to limit the scope of the present invention in any way) that an electrochemical reaction, such as electrolysis of water, may produce a proton gradient in the dispersion of nanoparticles that may lead to flocculation of the particles in the vicinity of the anode (where the proton concentration is highest). As will be appreciated by those skilled in the art, it is not necessary that the rate of flocculation and defloculation of the nanoparticles be the same. Thus, it may be preferred to drive an assembly of the present invention using a waveform in which pulses of alternating electrical polarity are applied in a time-sequential manner. For example, an addressing waveform may comprise a square-wave or sinusoidal "AC" form that may include rests (times when zero potential is applied). If the rate of flocculation (in the vicinity of the anode) is higher than the rate of deflocculation (in the vicinity of the cathode) the device will still exhibit increasing optical opacity, even though such a waveform may be DC-balanced in impulse. As is known in the art, DC-balancing in impulse may be used to limit damage to the device by electrochemical degradation of critical components, including the electrodes themselves.

Just as the rate of electrically-induced flocculation and deflocculation of the nanoparticles may not be identical, the rate of electrically-induced flocculation and thermally-induced deflocculation by (diffusional) equilibration may likewise not be identical. Furthermore, the rates of electrically-induced flocculation and of thermally-induced deflocculation may respond differently to changes in the rheology of the fluid in which the nanoparticles are dispersed. For example, the fluid may be made more viscous by introduction of large amounts of materials having relatively low molecular weights or small amounts of materials having relatively high molecular weights. It has been found experimentally, as described below with reference to Example 4 and FIGS. 6A and 6B, that making the fluid more viscous by incorporation of low molecular weight components (i.e., by changing the average molecular weight of a petroleum distillate by adding components having a molecular weight of less than about 1000) leads both to slower electrically-induced flocculation and to slower thermally-induced deflocculation. However, making the fluid more viscous by introduction of a relatively small amount of a soluble polymer of high molecular weight (in the case of Example 4, a polymer of molecular weight greater than about 1,000,000) does not appreciably change the rate of flocculation, but greatly decreases the rate of thermally-induced deflocculation.

It will thus be apparent that independent control of the rate of flocculation (i.e., the rate of development of optical opacity in response to an applied voltage) and deflocculation (i.e., the rate of return to optical clarity in the absence of electrical driving) is possible in the present invention. As noted above, acceleration of the rate of deflocculation may also be achieved by electrical driving.

The ability to control independently the rates of flocculation and deflocculation is important in practical embodiments of the present invention. For example, it may be desired to provide a variable transmission window powered by a photovoltaic element. Such a window could be self-contained and not require connection to mains electricity (although, of course an energy storage element such as a battery or capacitor may be provided to store photovoltaically-generated charge). For maximum power efficiency, it may be preferred to drive the window from a clear state to an opaque state electrically, but to allow it to return to a clear state thermally. Maintenance of the window in the opaque state could be provided by "top-up" electrical driving. In this embodiment, there will clearly be a need to control the rate of thermal clearing of the window relative to the rate of electrical opening as can be provided, as described above, by suitably controlling the rheology of the solvent in which the nanoparticles of the present invention are dispersed. For example, too slow a rate of thermal re-opening may be unacceptable, but too fast a rate of thermal re-opening may necessitate too great a load on the power supply for the "top-up" driving required when the window is desired to remain closed.

The nanoparticle dispersion used in the present invention may or may not be encapsulated. The nanoparticles are so small that typically gravitational settling is minimal. It has been found empirically that, when a 36.5% solids dispersion of alumina-passivated, nanoparticulate titanium dioxide in a mixture of oleic acid and Isopar G with a sample height of 10 cm and an internal tube diameter of 5 mm was centrifuged at 30G for 65 hours, no significant sedimentation occurred. If there is no sedimentation of a 10 cm sample at 30G, there would be no sedimentation for a 3 meter tall window at 1G. An unencapsulated medium of the present invention may be prepared by providing two sheets of glass (or other transparent material) each provided with a light-transmissive electrode on one surface, positioning the two sheets spaced apart from one another with their electrodes disposed on their adjacent surfaces, and pouring the nanoparticle dispersion into the gap between the two sheets; spacers or open cell structures may be provided between the sheets if desired to maintain proper spacing. However, in some cases, it may be desirable to encapsulate the nanoparticle dispersion in the form of capsules, microcells or polymer-dispersed materials. For example, a microcell encapsulated nanoparticle dispersion could provide useful mechanical support when disposed between two pieces of glass when the variable transmission medium is to be used in a high vibration environment.

The following Examples are now given, though by way of illustration only, to show details of preferred materials, conditions and techniques used in the present invention.

EXAMPLE 1

This Example illustrates the development of light scattering in a variable transmission medium of the invention by electrical addressing.

A pigment dispersion was prepared by adding 87.5 g of alumina passivated nanoparticulate titanium dioxide (grade MS-7, available from Kobo Corporation, South Plainfield, N.J.), 13.12 g oleic acid (150 mg oleic acid per gram of pigment), and 175 g of Isopar G or limonene to a 500 mL glass jar. The resultant mixture was shaken to disperse the pigment, then sonicated for 60 minutes in a bath sonicator, prior to high speed horizontal milling on a Netzsch MiniCer mill using milling conditions of 3500 RPM, pump speed 150 RPM, with 200 μm Zirconia medium (Zirmil from Saint Gobain) for 60 minutes. The 200 μm medium was then replaced with a similar 100 μm medium and the dispersion was milled for additional 60 minutes under the same milling conditions as before.

The dispersion (with limonene solvent) was placed between two glass plates each having an indium tin oxide (ITO) coating and the resultant cell placed on a black background. The cell was then driven with 250 millisecond pulses at 30 V, separated by rests of 250 milliseconds as shown in the lower part of FIG. 2. The upper part of the same Figure shows the reflectivity of the cell (measured as L* on the usual CIE L*a*b* system). From FIG. 2 it will be seen that as the drive pulses were applied (from t=5 to t=10.25 seconds), the reflectivity of the cell rose from 29 L* (the transparent state, viewed against the black background) to 47 L* (the scattering state, viewed against the black background). From t=10.25 to t=18 seconds, the cell was driven with an AC voltage of ±40V at 55 Hz and returned to its original transparent state.

In separate experiments, a transparent state haze of 3.5 percent and an opaque state of 87 percent haze were achieved by driving the same dispersion in a similar cell and in a similar way, and measuring the optical clarity using a transmission spectrometer, calculating haze as defined in ASTM standard D1003.

EXAMPLE 2

This Example illustrates the effect of treating a variable transmission medium of the invention with acid and base.

A sample of untreated yttria-stabilized zirconium oxide nanoparticles ($ZrO_2$-3Y, 8522QI 25, nm) from Skyspring Nano (Houston, Tex.) with 2500 ppm chloride content (measured by combustion ion chromatography) was dispersed following the same procedure as in Example 1. This dispersion was diluted to 2 weight percent pigment by addition of limonene and a 19.5 g sample was added to a 2 cm diameter vial. The dispersion was then titrated with freshly prepared 2 weight percent trifluoroacetic acid (TFA, purchased from Sigma Aldrich) in limonene. Turbidity was measured using a Hach 2100AN turbidimeter and reported in nephelometric turbidity units (NTU). After adding acid a 10 weight percent solution of trioctylamine (purchased from Sigma Aldrich) in limonene was then titrated into the dispersion.

A sample of yttria-stabilized zirconium oxide nanoparticles containing 1400 ppm chloride was prepared by washing the aforementioned $ZrO_2$-3Y with three 1 deionized water washes. The pigment was then dried overnight under vacuum at 85° C. This pigment was then milled, diluted and titrated under identical conditions as the sample containing 2500 ppm chloride.

As can be seen from FIG. 3 (open circles), after about 0.2 mmole of trifluoroacetic acid (TFA) had been added to the unwashed zirconium oxide dispersion, further addition of acid led to rapid development of turbidity. Addition of an approximately stoichiometric amount of a base, trioctylamine (TOA), reversed the effect (closed circles). The same effects were seen with the washed zirconium oxide (open and closed squares) but in this case a much larger amount of acid was needed to initiate turbidity. This result is consistent with hydrogen chloride (a possible byproduct from the production of the nanoparticles, and a strong acid) having been removed by the washing process. Accordingly, with some variable transmission media of the present invention, it may be desirable to titrate the media with acid prior to use, and adjust with acid or base to tune sensitivity; addition of acid would lead to higher sensitivity; addition of base to lower sensitivity.

EXAMPLE 3

This Example illustrates that the effect of blocking current in an assembly of the invention, by coating the electrodes with a nonconductive material, is to inhibit the development of opacity, thus demonstrating that the change in light transmission is not caused by electrophoresis of the nanoparticles alone.

A dispersion was prepared by combining 174.5 g of yttria-stabilized zirconium oxide nanoparticles ($ZrO_2$-3Y), 100.6 g of high purity limonene (from Florida Chemical Company) and 84.5 g of a 24.8 weight percent solution of DSP-OL300 (polyhydroxystearic acid, PHSA, from Innospec Performance Chemicals, Ellesmere Port, United Kingdom), in limonene in a 1 plastic bottle with 1687 g of 0.6 mm Zirmil and 250 g of 5.0 mm YTZ yttria-stabilized Zirconia media and milling for 1 week at room temperature on a roll mill at approximately 200 RPM. The media were removed via filtration and the refractive index was matched to the desired target of 1.54 by addition of limonene.

Liquid test cells were built by sandwiching this dispersion between two sheets of indium tin oxide (ITO) glass with a 1 mil plastic shim. Electro-optical testing was performed on a transmission bench applying a waveform consisting of 10 cycles of 750 milliseconds 30 V, 250 milliseconds 0 V, 750 milliseconds −30 V, 250 milliseconds 0 V. Coated electrodes were prepared by spin coating a solution of 5 weight percent poly(methyl methacrylate) (PMMA, Mw approximately 350 kg/mole, purchased from Sigma Aldrich, Milwaukee, Wis.), in toluene on to ITO glass slides at 3000 RPM for 30 seconds. The thickness of the deposited layer was measured using a Zygo interferometer to be approximately 100 nm.

As can be seen in FIG. 4, when the polymer coating was applied to the electrodes, no change in haze was seen when addressing the sample. Under the same conditions, using the uncoated electrodes, the haze rose from about 10% to about 62%. These results show that current flow is necessary for flocculation to occur (leading to light scattering and consequent haze).

EXAMPLE 4

This Example illustrates that independent control of the rates of electrically-induced flocculation and deflocculation (opacification and relaxation) may be achieved by the addition of soluble polymers to the fluid of media of the present invention Nanoparticulate titanium dioxide (grade MS-7, available from Kobo Corporation, South Plainfield, N.J.) was dispersed via milling (on a Netzsch mill) in the presence of dispersant (oleic acid). The stock dispersion was 20 weight percent nanotitania and 6 weight percent oleic acid dispersed in Isopar E.

This dispersion was diluted with a) Isopar E; b) Isopar V (a more viscous hydrocarbon grade); or c) a solution of a polyisobutylene (PIB) polymer (Oppanol B200, available from BASF Corporation) in Isopar E.

Each dilution was a factor of two by weight, i.e., accomplished by mixing equal weights of stock dispersion and diluent, as described in the Table below. In this Table, amounts are expressed in terms of total sample mass. For example, for sample IE/PIB, the PIB amount of 0.6% total mass corresponds to 0.69% of fluid phase mass (ignoring nanotitania and oleic acid). Upon preparation the samples were left to equilibrate at least overnight.

TABLE

| Sample name | Nanoparticles | Oleic acid | Isopar E | Isopar V | PIB |
|---|---|---|---|---|---|
| IE/IE | 10% | 3% | 87% | 0 | 0 |
| IE/IV | 10% | 3% | 50% | 37% | 0 |
| IE/PIB | 10% | 3% | 86.4% | 0 | 0.6% |

To test the electro-optical response samples were loaded into a cell comprising two ITO-coated glass slides, ITO sides facing each other, spaced apart with a ring shim spacer (1.5 inches internal diameter, 0.002 inches thick (38 mm internal diameter, 0.05 mm thick). The slides were held together by paper clips, clipped across the shim spacer to prevent slides from bowing in under stress. The test cell was loaded with enough sample dispersion to completely fill the inner ring of the shim; any overfill was dabbed away with a tissue.

Optical response was tested on a custom transmission measurement bench. The waveform used was 30V, 0.25 Hz, square wave, no offset. Each test started with 20 seconds without driving, after which the waveform was applied for 30 seconds, followed by 1 hour without driving. The optical response was recorded during this whole time, at a sampling rate of 5 s$^{-1}$.

The haze reported here is in arbitrary units (AU). However, as all the samples were tested in the same way (same mounting, same spacers, under a single and same detector calibration) relative sample-to-sample comparisons can be made. This is particularly true when comparing timescales alone.

Figure 6A:
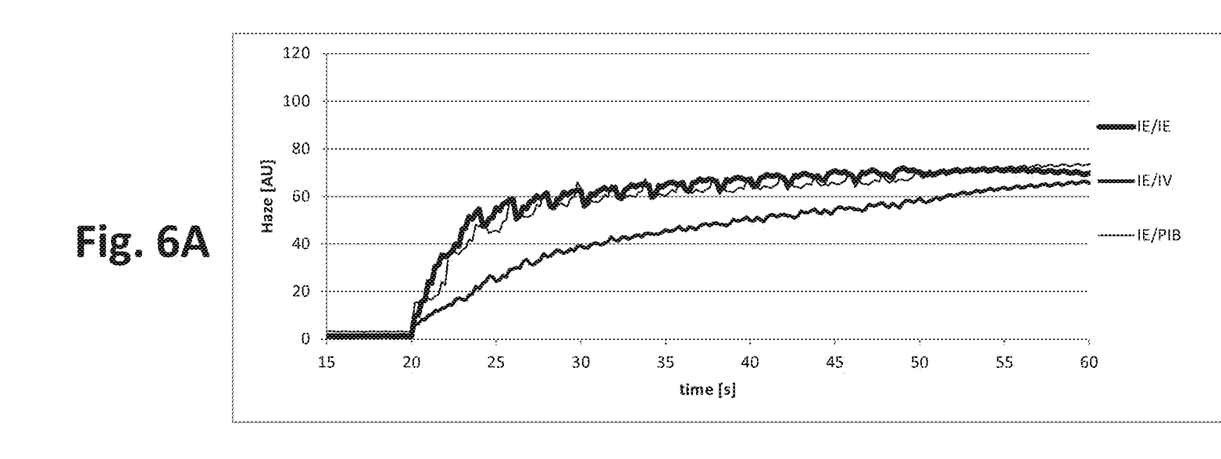
Figure 6B:
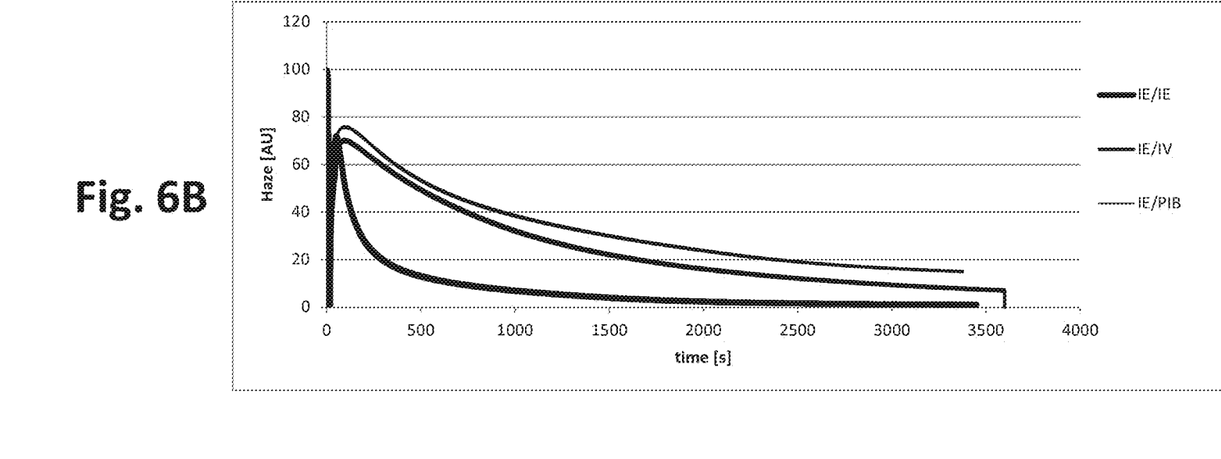

The electro-optical response of the three samples described is shown in FIGS. 6A and 6B. FIG. 6A shows the drive from a clear to an opaque state, while FIG. 6B shows the recovery to the clear state without driving. As can be seen in FIG. 6A, the all-Isopar E sample and the sample containing PIB dissolved in Isopar E developed opacity at the same rate. The sample in which the Isopar E had been diluted with the more viscous Isopar V, on the other hand, developed opacity at a slower rate.

The rates of recovery from the opaque to the clear state are shown in FIG. 6B. Here the all-Isopar E sample recovered very quickly to the clear state, while the other two samples recovered at about the same, slower rate.

It will be clear, therefore, that in a given fluid (here, Isopar E) the rate of recovery from the opaque state may be controlled independently of the rate of driving to the opaque state by addition of a polymer that is soluble in the fluid. In this particular experiment, the molecular weight of the polymer was on the order of 1,000,000. Polymers or oligomers having molecular weights as low as about 10,000 may also be used.

From the foregoing, it will be seen that the present invention can provide a variable transmission medium having a very low haze in its transparent state with a highly opaque scattering state, and which is thus very attractive for commercial applications such as variable transmission windows. No encapsulation of the variable transmission medium is necessary, although encapsulation can be used if desired. The power requirements of the variable transmission medium of the invention are acceptable.

It will be apparent to those skilled in the art that numerous changes and modifications can be made in the specific embodiments of the invention described above without departing from the scope of the invention. Accordingly, the whole of the foregoing description is to be interpreted in an illustrative and not in a limitative sense.

The invention claimed is:

1. A method of varying the opacity of a variable transmission assembly comprising:
   providing a variable transmission assembly including a first light-transmissive electrode, a second light-transmissive electrode, and a variable transmission medium disposed between the first and second light-transmissive electrodes, wherein the variable transmission medium comprises zirconium dioxide nanoparticles, titanium dioxide nanoparticles, or zinc oxide nanoparticles dispersed in a fluid having a dielectric constant less than 10, wherein the zirconium dioxide nanoparticles, titanium dioxide nanoparticles, or zinc oxide nanoparticles have adsorbed thereon a stabilizing material that comprises a carboxylic acid or carboxylate group attached to a chain of at least 10 carbon atoms;
   providing a first electric current between the first and second light-transmissive electrodes and through the variable transmission medium, wherein the first electric current has a square or sinusoidal AC form and includes one or more rests, wherein a zero potential is applied during the rest, and wherein the first electric current produces a proton gradient in the variable transmission medium, causing the nanoparticles to flocculate and form aggregates that scatter light; and
   providing a second electric current, wherein the second electric current is an AC current having frequency of 60 Hz and higher, causing thermally-induced de-flocculation of the nanoparticles that increases the light-transmissivity of the variable transmission assembly.

2. The method of claim 1, wherein the variable transmission medium is contained within a plurality of microcapsules, microcells, or discrete droplets, the discrete droplets being surrounded by a continuous phase comprising a polymeric material.

3. The method of claim 1, wherein the stabilizing material comprises stearic acid.

4. The method of claim 1, wherein the fluid comprises an aliphatic hydrocarbon or a terpene.

5. The method of claim 4, wherein the terpene is limonene.

6. The method of claim 1, wherein the first or second light-transmissive electrode comprises indium tin oxide (ITO) or poly(3,4-ethylenedioxythiophene) polystyrene sulfonate (PEDOT).

7. The method of claim 1, wherein the zirconium dioxide nanoparticles, titanium dioxide nanoparticles, or zinc oxide nanoparticles are between 10 and 100 nm in diameter.

8. The method of claim 1, wherein the fluid of the variable transmission medium is a petroleum distillate having molecular weight of less than about 1000 g/mole.

9. The method of claim 1, wherein the fluid of the variable transmission medium further comprises a polymer which is soluble in the fluid, wherein the polymer has molecular weight of from about 10,000 to about 1,000,000 g/mole.

10. The method of claim 1, wherein the variable transmission medium further comprises a soluble polymer having a molecular weight greater than about 1,000,000 g/mole.

11. The method of claim 1, wherein the first and second light-transmissive electrodes are not coated by a polymer.

\* \* \* \* \*